(12) United States Patent
Kitajima et al.

(10) Patent No.: US 7,275,706 B2
(45) Date of Patent: Oct. 2, 2007

(54) SPOOL FOR SPINNING REEL

(75) Inventors: Keigo Kitajima, Sakai (JP); Shingo Matsuo, Sakai (JP); Hirokazu Hiraoka, Sakai (JP); Yutaka Inoue, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/506,822

(22) Filed: Aug. 21, 2006

(65) Prior Publication Data
US 2007/0075172 A1  Apr. 5, 2007

(30) Foreign Application Priority Data
Sep. 22, 2005  (JP) ............................. 2005-275095

(51) Int. Cl.
*A01K 89/01* (2006.01)
(52) U.S. Cl. ..................................................... 242/322
(58) Field of Classification Search ................ 242/322
See application file for complete search history.

(56) References Cited
U.S. PATENT DOCUMENTS

| | | | | |
|---|---|---|---|---|
| 2,309,146 A | * | 1/1943 | Whistler | 242/118.4 |
| 2,336,981 A | * | 12/1943 | Clickner | 242/118.7 |
| 2,690,309 A | * | 9/1954 | Cuonz et al. | 242/282 |
| 4,746,079 A | * | 5/1988 | Newell | 242/129.7 |
| 5,947,400 A | * | 9/1999 | Tsutsumi | 242/322 |
| 6,286,772 B1 | * | 9/2001 | Koelewyn | 242/246 |
| 6,959,887 B2 | * | 11/2005 | Kawasaki | 242/322 |
| 2004/0079822 A1 | * | 4/2004 | Kawasaki | 242/322 |

FOREIGN PATENT DOCUMENTS

| | | |
|---|---|---|
| EP | 1 527 681 A1 | 10/2004 |
| FR | 894 624 | 12/1944 |
| JP | 2000-050774 A | 2/2000 |

\* cited by examiner

*Primary Examiner*—Emmanuel M Marcelo
(74) *Attorney, Agent, or Firm*—Global IP Counselors, LLP

(57) ABSTRACT

A spool for preventing backlash includes a bobbin trunk, a rear flange portion, and a front flange portion. The front flange portion includes a first protruding portion and a first oblique portion that protrudes upward and forward from a tip of the first protruding portion. The rear flange portion includes a second protruding portion and a second oblique portion that protrudes upward and rearward from a tip of the second protruding portion. A length in the radial direction of the second protruding portion is approximately the same as a length of the first protruding portion.

24 Claims, 12 Drawing Sheets

SPOOL FOR SPINNING REEL

CROSS-REFERENCE TO RELATED APPLICATIONS

This application claims priority under 35 U.S.C. § 119 to Japanese Patent Application No. 2005-275095 filed Sep. 22, 2005. The entire disclosure of Japanese Patent Application No. 2005-275095 is hereby incorporated herein by reference.

BACKGROUND OF THE INVENTION

1. Field of the Invention

The present invention generally relates to a spool. More specifically, the present invention relates to a spool for a spinning reel with fishing line wound on an outer periphery of the spool.

2. Background Information

In general, a spinning reel comprises a reel unit, a rotor and a spool. The rotor is rotatably supported on the reel unit. The spool is arranged in front of the rotor and the fishing line is wound on an outer periphery thereof.

This type of spool comprises a bobbin trunk, a front flange and a skirt portion. The fishing line is wound on an outer periphery of the bobbin trunk. The front flange is mounted on a front end portion of the bobbin trunk. The front flange has a diameter that is larger than a maximum outer diameter of the bobbin trunk. The skirt portion is mounted on the rear end portion of the bobbin trunk. The skirt portion has a diameter larger than the maximum outer diameter of the bobbin trunk. The bobbin trunk and the skirt portion are two (large and small) cylindrical members. They are made of a synthetic resin, for example, and are integrally formed with the front flange portion (see, for example, Japanese Unexamined Patent Publication No. 2000-50774). In this type of spool, portions of the front flange and the skirt portion, which protrude outward in the radial direction, are formed to have approximately the same length. Therefore, it is possible to wind fishing line onto the bobbin trunk up to the height corresponding to the position of the tip of the front flange.

The conventional spool is formed so that the portions of the front flange portion and the skirt portion thereof, which protrude outward in the radial direction, have approximately the same length. Therefore, it is possible to wind the fishing line onto the bobbin trunk up to the height corresponding to the position of the tip of the front flange. However, if the fishing line is wound onto the bobbin trunk up to the limit of the height corresponding to the position of the tip of the front flange, the fishing line may be bunched and the bunched fishing line may fall forward from the front flange when casting. If the fishing line is paid out in a state that the fishing line falls from the front flange, a state that looped fishing line is tangled, the so-called backlash may be caused.

In view of the above, it will be apparent to those skilled in the art from this disclosure that there exists a need for an improved spool that reliably prevents backlash. This invention addresses this need in the art as well as other needs, which will become apparent to those skilled in the art from this disclosure.

SUMMARY OF THE INVENTION

A spool for a spinning reel according to a first aspect of the present invention is a spool for a spinning reel that comprises a cylindrical bobbin trunk, a front flange portion and a rear flange portion. The bobbin trunk has an outer periphery configured for winding fishing line thereon. The front flange portion includes a first protruding portion that protrudes outward in a radial direction from a front end portion of the bobbin trunk, and a first oblique portion that protrudes forward from a tip of the first protruding portion. The first oblique portion has a diameter that increases from the tip of the first protruding portion to a front end side of the first oblique portion. The rear flange portion includes a second protruding portion that protrudes outward in the radial direction from a rear end portion of the bobbin trunk, and a second oblique portion that protrudes rearward from a tip of the second protruding portion. The second oblique portion has a diameter that increases from the tip of the second protruding portion to a rear end side of the second oblique portion. The second protruding portion has a length that is approximately the same as a length of the first protruding portion in the radial direction.

In this spool, the rear flange portion has the second protruding portion that protrudes outward from the rear end portion of the bobbin trunk in the radial direction so that the length thereof is approximately the same as the length of the first protruding portion in the radial direction. Therefore, the angler winds fishing line around the bobbin trunk using the tip positions of the first and second protruding portions (the base end portion positions of the first and second oblique portions) as an indicator of the maximum winding position, and accordingly it is possible to prevent the fishing line from being wound up to the limit of the height of the tip position of the front flange. Therefore, a situation that fishing line is bunched and the bunched fishing line falls forward from the front flange portion can be avoided, and thus a backlash can be prevented from being caused.

In addition, here, the front flange portion comprises the first oblique portion that protrudes outward from the tip of the first protruding portion so that the diameter thereof expands from the tip of the first protruding portion to the front end portion side. Therefore, even if the fishing line runs on to the first oblique portion, it becomes difficult for the fishing line to move forward any more. Therefore, it is possible to reliably prevent a backlash from being caused by providing this type of first oblique portion with a spool.

A spool in accordance with a second aspect of the present invention is the spool according to the first aspect of the present invention, wherein the length of the first oblique portion in the radial direction is approximately the same as the length of the second oblique portion in the radial direction.

A spool in accordance with a third aspect of the present invention is the spool according to the first aspect or the second aspect of the present invention, wherein the first oblique portion is an annular member that is formed separately from the first protruding portion. In this configuration, the first oblique portion is formed with a material that is different from that of the first protruding portion. For example, if the first oblique portion is formed by a hard material, it is possible to prevent the first oblique portion from being scratched by contact with the fishing line. In addition, the first oblique portion is formed to be an annular member. Therefore, weight of the spool is reduced and it becomes easier for the first oblique portion to be attached and secured to the first protruding portion. Furthermore, the first oblique portion is formed separately from the first protruding portion. Therefore, it becomes easier to form the first oblique portion and the first protruding portion.

A spool in accordance with a fourth aspect of the present invention is the spool according to one of the first through third aspects of the present invention, further comprising a cylindrical portion that protrudes rearward from the tip of the second oblique portion. In this configuration, it is possible to prevent the fishing line from further moving rearward from the tip of the second oblique portion.

A spool in accordance with a fifth aspect of the present invention is the spool according to the fourth aspect of the present invention, wherein the base end portion of the second oblique portion is formed in continuation of the tip of the second protruding portion so that the continuation portion is formed in a pointed shape, and the tip of the second oblique portion is formed in a smooth continuation of the front end portion of the cylindrical portion, and a contour of the second oblique portion is formed with a fillet shape. In this configuration, a boundary portion between the tip position of the second protruding portion and the base end position of the second oblique portion is distinctly formed. Therefore, it becomes easy to grasp an indicator of the maximum winding position. In addition, the boundary portion is formed in a curved shape and thus, design of the spool is improved.

A spool in accordance with a sixth aspect of the present invention is the spool according to the fourth aspect or the fifth aspect of the present invention, wherein the second oblique portion is integrally formed with the second protruding portion and the cylindrical portion. In this configuration, if the second oblique portion and the cylindrical portion are integrally formed, strength of the spool is maintained at a high level.

A spool in accordance with a seventh aspect of the present invention is the spool according to one of the first through sixth aspects of the present invention, wherein the bobbin trunk is integrally formed with the first protruding portion and the second protruding portion. In this configuration, for example, if the first protruding portion, the bobbin trunk, the second protruding portion, the second oblique portion, and the cylindrical portion are integrally formed, the strength of the spool is maintained at a high level and the number of separate components is reduced.

According to the present invention, in a spool of a spinning reel, a front flange portion includes a first oblique portion that protrudes forward from the tip of a first protruding portion so that the diameter thereof expands from the tip of the first protruding portion to the front end portion side, and a skirt portion includes a second protruding portion that protrudes outward from the rear end portion of a bobbin trunk in the radial direction so that the length thereof is approximately the same as the length of the first protruding portion in the radial direction. Accordingly, a bundle of fishing line is prevented from falling forward from the front flange portion and thus, it is possible to prevent backlash.

These and other objects, features, aspects and advantages of the present invention will become apparent to those skilled in the art from the following detailed description, which, taken in conjunction with the annexed drawings, discloses embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
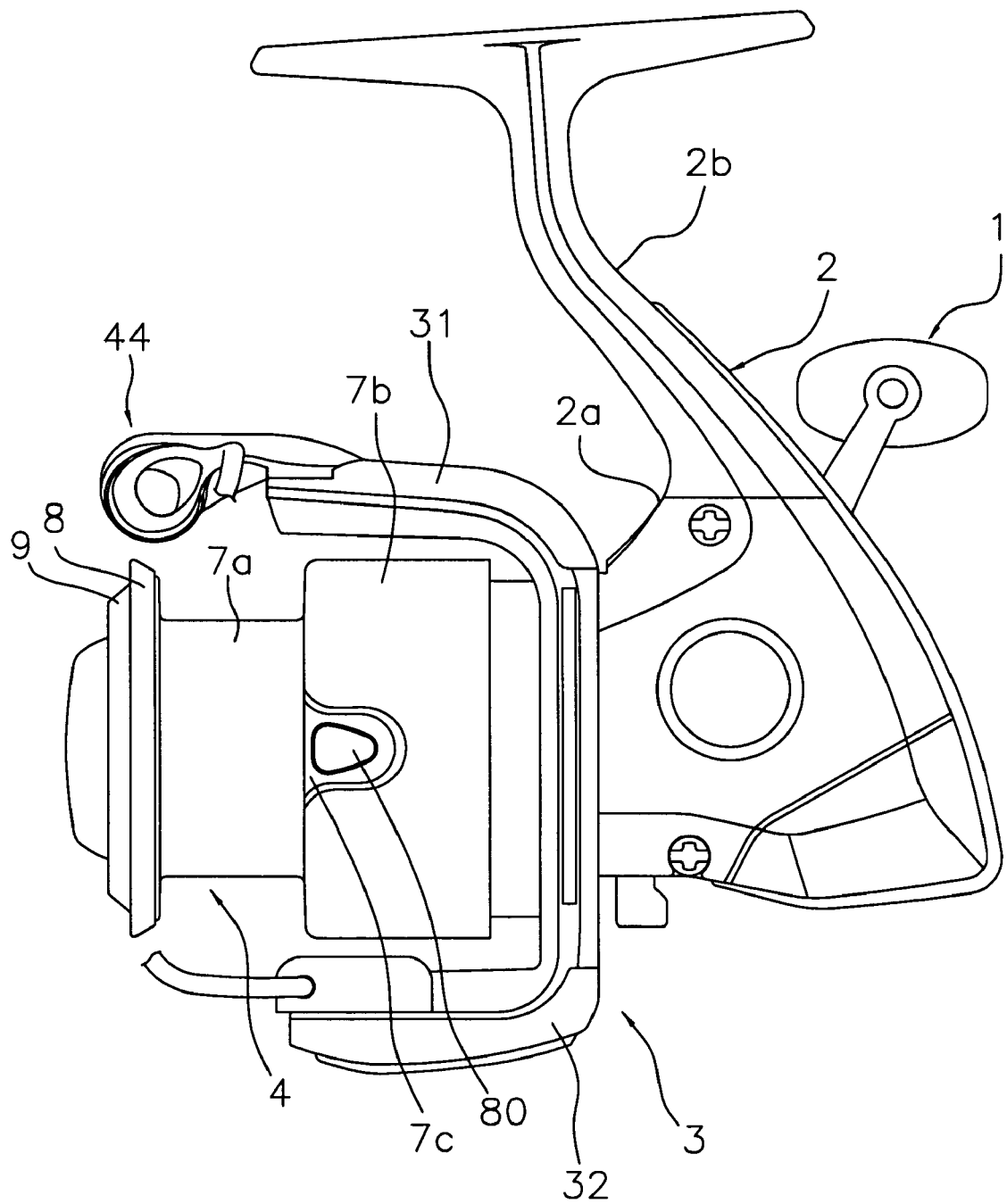
FIG. 1 is a lateral view of a spinning reel equipped with a spool according to a first embodiment of the present invention.

Referring initially to FIG. 1, a spinning reel in accordance with a first embodiment of the present invention includes a reel unit 2, a rotor 3 and a spool 4. The reel unit 2 rotatably supports a handle 1. The rotor 3 is rotatably supported on a front portion of the reel unit 2. The spool 4 is disposed on a front portion of the rotor 3 such that the spool 4 is able to move back and forth. The spool 4 has an outer peripheral surface on which fishing line is wound.

Figure 2:
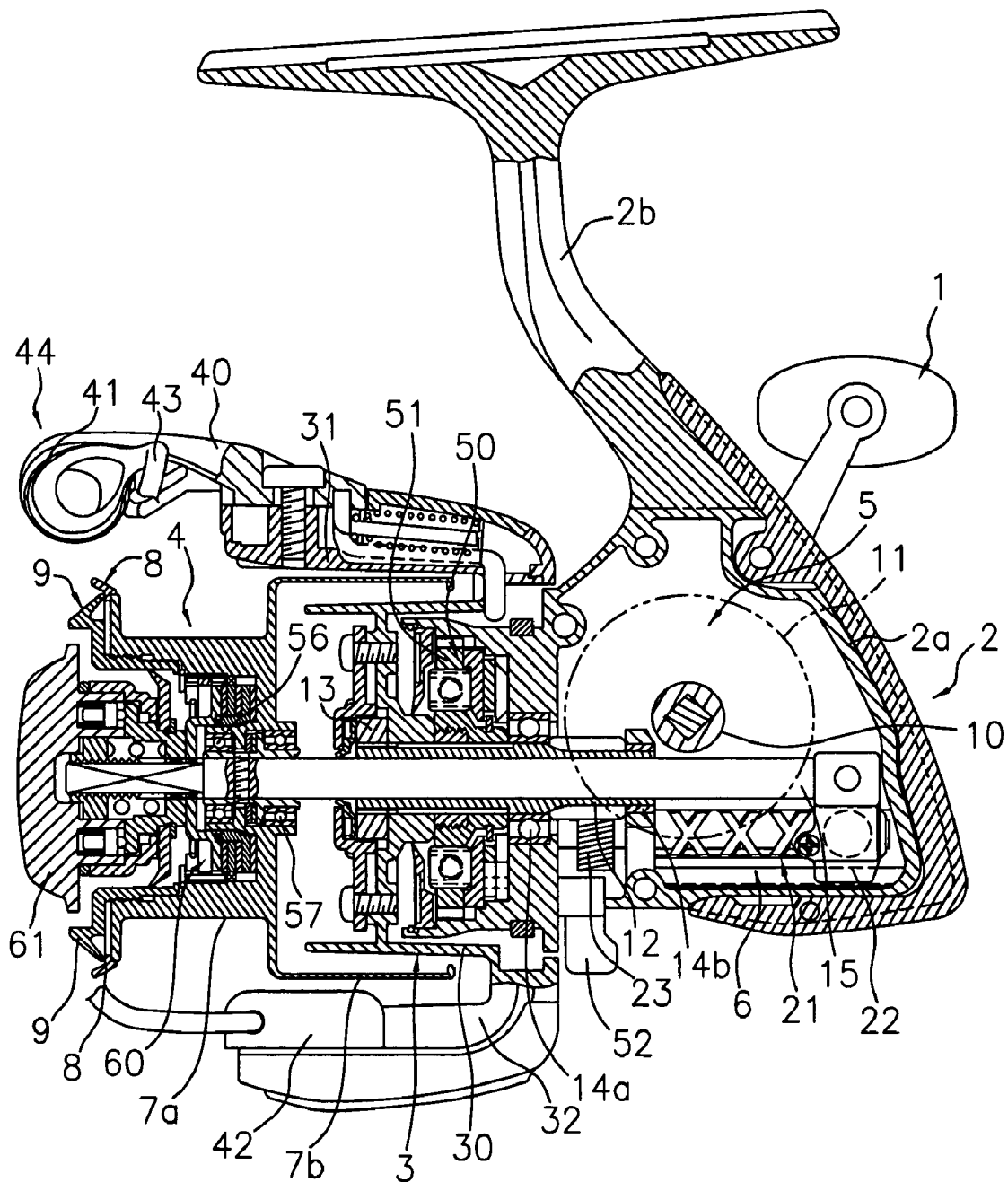
FIG. 2 is a lateral partial cross-sectional view of the spinning reel equipped with the spool according to the first embodiment of the present invention.

The reel unit 2 includes a reel body 2a and a rod attachment leg 2b that extends diagonally upward and forward from the reel body 2a. As shown in FIG. 2, the reel body 2a forms an interior space with a rotor driving mechanism 5 and an oscillating mechanism 6 therein. The rotor driving mechanism 5 rotates the rotor 3 in association with a rotation of the handle 1. The oscillating mechanism 6 moves the spool 4 back and forth to uniformly wind the fishing line onto the spool 4.

As shown in FIG. 2, the rotor driving mechanism 5 includes a face gear 11 and a pinion gear 12. The face gear 11 rotates together with a handle shaft 10 on which the handle 1 is secured. The pinion gear 12 meshes with the face gear 11. The pinion gear 12 has a cylindrical shape and a front portion that penetrates a center portion of the rotor 3. The front portion of the pinion gear 12 is secured to the rotor 3 with a nut 13. In addition, a middle portion and a rear end portion of the pinion gear 12 are rotatably supported on the reel unit 2 by bearings 14a and 14b, respectively.

The oscillation mechanism 6 moves the spool 4 forward and backward by moving a spool shaft 15 that is coupled to the center of the spool 4 through a drag mechanism 60. As shown in FIG. 2, the oscillation mechanism 6 includes a worm shaft 21, a slider 22 and an intermediate gear 23. The worm shaft 21 is disposed below and parallel to the spool shaft 15. The slider 22 moves back and forth along the worm shaft 21. The intermediate gear 23 is secured to a tip of the worm shaft 21. A rear end of the spool shaft 15 is non-rotatably secured to the slider 22. The intermediate gear 23 meshes with the pinion gear 12.

As shown in FIG. 2, the rotor 3 includes a cylindrical portion 30, a first rotor arm 31 and a second rotor arm 32. The first and second rotor arms 31 and 32 are arranged opposite to each other on sides of the cylindrical portion 30. The cylindrical portion 30, the first rotor arm 31 and the second rotor arm 32 are made of, for example, an aluminum alloy. The cylindrical portion 30, the first rotor arm 31 and the second rotor arm 32 are integrally formed together.

As shown in FIG. 2, a bail arm 44 guides the fishing line onto the spool 4. The bail arm 44 includes a first bail support member 40, a second bail support member 42, a line roller 41 and a bail 43. The bail arm 44 pivots between a line-guiding position (shown in FIG. 2) and a line-releasing position, in which the bail arm 44 flips from the line-guiding position. The first bail support member 40 is pivotally mounted on an outer peripheral side of a tip of the first rotor arm 31. The line roller 41 guides the fishing line to the spool 4. The line roller 41 is mounted to a tip of the first bail support member 40. In addition, a second bail support member 42 is pivotally mounted to an inner peripheral side of a tip of the second rotor arm 32. The bail 43 is a wire member curved into an approximately U-shape. The bail 43 is secured between the line roller 41 and the second bail support member 42.

An anti-reverse rotation mechanism 50 prevents reverse rotation of the rotor 3 is disposed in an interior of the cylindrical portion 30 of the rotor 3. As shown in FIG. 2, the anti-reverse rotation mechanism 50 includes a roller-type one-way clutch 51 and a switching mechanism 52. The one-way clutch 51 has a freely rotating inner race. The switching mechanism 52 switches the one-way clutch 51 between an operating state (in which reverse rotation is impossible) and a non-operating state (in which reverse rotation is possible).

Figure 3:
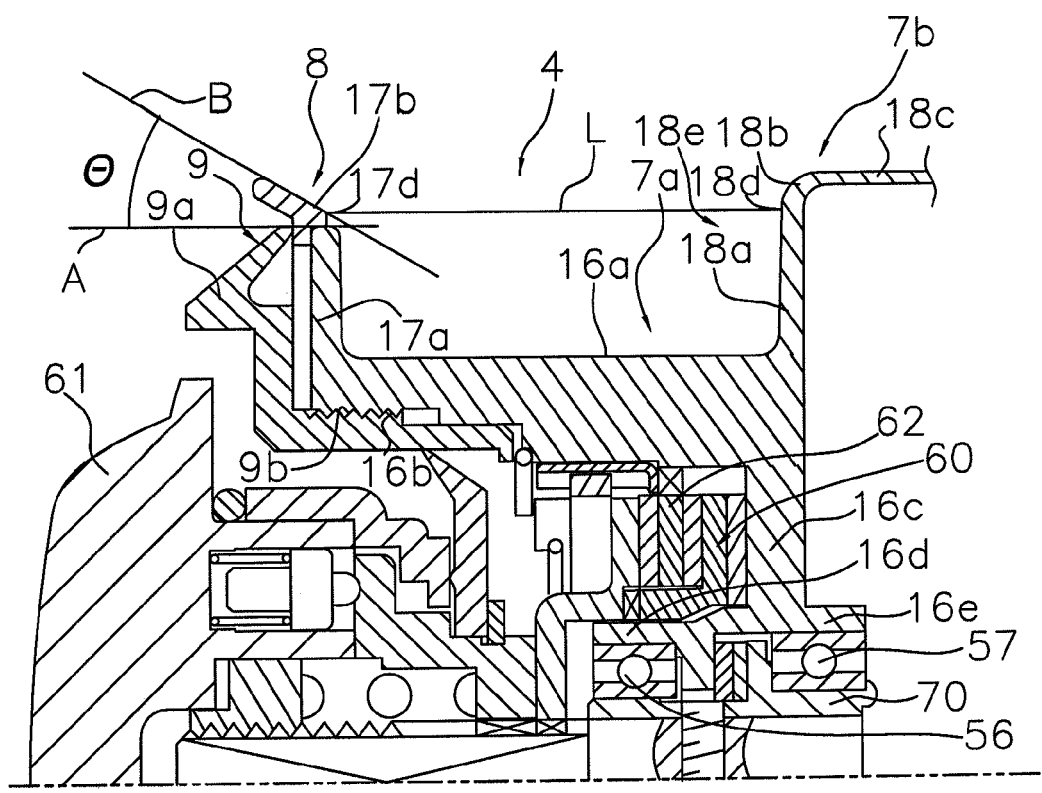
FIG. 3 is an enlarged lateral partial cross-sectional view of the spool of the spinning reel of FIGS. 1 and 2 according to the first embodiment of the present invention.
Figure 4:
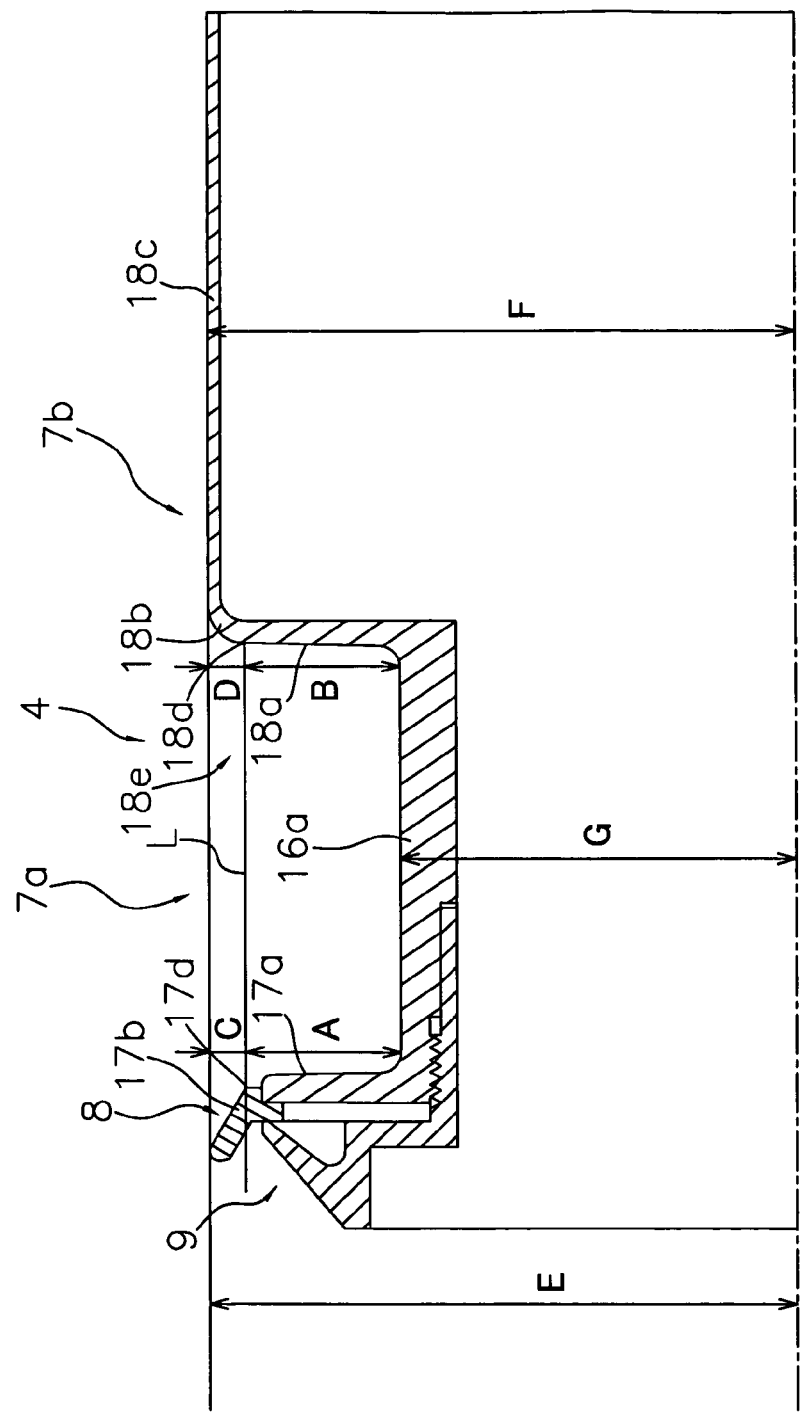
FIG. 4 is an enlarged lateral partial cross-sectional view of the spool of FIG. 3 showing dimensional relationships of the spool according to the first embodiment of the present invention.

As shown in FIG. 2, the spool 4 is disposed between the first rotor arm 31 and the second rotor arm 32 of the rotor 3. Referring to FIGS. 2-4, the spool 4 includes a cylindrical bobbin trunk 7a, a cylindrical large-diameter skirt portion 7b, a large-diameter front flange portion 8 and a front flange fastening member 9. The fishing line is wound on an outer periphery of the bobbin trunk 7a. The skirt portion 7b is integrally formed with a rear end portion of the bobbin trunk 7a. The bobbin trunk 7a and the skirt portion 7b may be made of a synthetic resin or metal and integrally formed. Alternatively, the bobbin trunk 7a and the skirt portion 7b may be comprised of materials that are different from each other. The front flange portion 8 is mounted on a front end portion of the bobbin trunk 7a. The front flange fastening member 9 fastens the front flange portion 8 on the bobbin trunk 7a. The spool 4 is a hybrid spool comprised of a two-tier (small and large tiers) cylindrical member. The outer periphery of the spool 4 is formed by forging a metal member made of an aluminum alloy, for example, with a cylindrical member that is formed by insert-molding a synthetic resin member in the inner peripheral portion of a cylindrical member. The spool 4 is rotatably mounted on the spool shaft 15 by a first bearing 56 and a second bearing 57. The bobbin trunk 7a includes a line winding surface that is parallel to the spool shaft 15. However, it will be apparent to one of skill in the art from this disclosure that the spool 4 can have a circular-cone-shaped bobbin trunk 7a in which a line winding surface is formed on a tapered surface that is dwindling toward the tip or expanding toward the tip.

Referring to FIGS. 3 and 4, the bobbin trunk 7a includes a bobbin cylindrical portion 16a, a female threaded portion 16b and a plate shaped inner peripheral portion 16c. The bobbin cylindrical portion 16a is a metal member formed in a cylindrical shape. The female threaded portion 16b is formed on an inner peripheral side of a front portion of the bobbin cylindrical portion 16a. The inner peripheral portion 16c integrally extends with an inner peripheral side of a rear portion of the bobbin cylindrical portion 16a. The female threaded portion 16b attachably/detachably mounts the front flange fastening member 9 to the bobbin trunk 7a.

The bobbin trunk 7a further includes first and second support portions 16d and 16e formed in a closed end cylindrical shape. The first and second support portions 16d and 16e are respectively formed on a front and a rear side of the inner peripheral portion 16c, respectively. The first bearing 56 and the second bearing 57 are mounted on inner peripheral sides of the first and second support portions 16d and 16e, respectively. The first and second bearings 56 and 57 are rotatably mounted on the spool shaft 15 via a cylindrical retaining member 70. It will be apparent to one of skill in the art from this disclosure that the present invention is not limited to a first and second bearing 56 and 57, and may, for example, have a structure in which only one bearing is employed.

As shown in FIG. 3, the front flange portion 8 includes a first flange member 8a and a second flange member 8b. The first flange member 8a is integrally formed with a front end portion of the bobbin trunk 7a. The second flange member 8b is attachably/detachably mounted on the tip of the first flange member 8a. The first flange member 8a is a metal member integrally formed with the bobbin trunk 7a. The first flange member 8a is formed in a smooth continuation with the front end portion of the bobbin trunk 7a. A rear side surface of the first flange member 8a is slightly sloped forward such that a diameter thereof expands toward a front end side of the front flange portion 8. The second flange member 8b is a metal or toughened ceramic annular member that is formed separately from the first flange member 8a. The second flange member 8b includes a first oblique portion 17b, a stepped portion 17c, a first corner portion 17d and a plate member 17e. The first flange member 8a and the plate member 17e of the second flange member 8b constitute a first protruding portion 17a. The first oblique portion 17b protrudes forward from a tip of the first protruding portion 17a. The first oblique portion 17b bends forward from the plate member 17e and has a diameter that increases from the tip of the first protruding portion 17a to a front end side of the first oblique portion 17b. The first obliqiue portion 17b is formed along a line B that is at an angle θ of less than 45 degrees from a line A. Line A is parallel to a longitudinal axis of the spool 4. The spool 4 rotates around the longitudinal axis of the spool 4. The second flange member 8b protrudes rearwardly to form the stepped portion 17c. In the first oblique portion 17b, the length in the axial direction is longer than the length in the radial direction. The stepped portion 17c and the plate member 17e cover a front side of the tip of the first protruding portion 17a. A rear side of the tip of the first protruding portion 17a is exposed outward from the stepped portion 17c. In addition, the first corner portion 17d is pointed rearwardly and is formed on a boundary between the first oblique portion 17b and the plate member 17e. The plate member 17e is arranged radially inward from the first corner portion 17d. The first corner portion 17d serves as an indication for a maximum winding position L of the fishing line.

Referring to FIGS. 2-4, the skirt portion 7b is integrally formed with the bobbin trunk 7a in a cylindrical shape so as to cover the cylindrical portion 30 of the rotor 3. The skirt portion 7b is formed by forging a metal member such as an aluminum alloy.

As shown in FIGS. 3 and 4, the skirt portion 7b includes a rear flange portion 18e and a skirt cylindrical portion 18c that protrudes rearward from a tip of the rear flange portion 18e. The rear flange portion 18e includes a second protruding portion 18a and a second oblique portion 18b. The second protruding portion 18a protrudes outward in the radial direction from a rear end portion of the bobbin trunk 7a. A length of the second protruding portion 18a is approximately the same as a length A of the first protruding portion 17a in the radial direction. The second oblique portion 18b protrudes rearward from a tip of the second protruding portion 18a. A length of the second oblique portion 18b in the radial direction is approximately the same as a length C of the first oblique portion 17b in the radial direction. A diameter of the second oblique portion 18b expands from the tip of the second protruding portion 18a to a rear end portion side of the second oblique portion 18b. The skirt cylindrical portion 18c rearwardly protrudes from a tip of the second oblique portion 18b.

Figure 5:
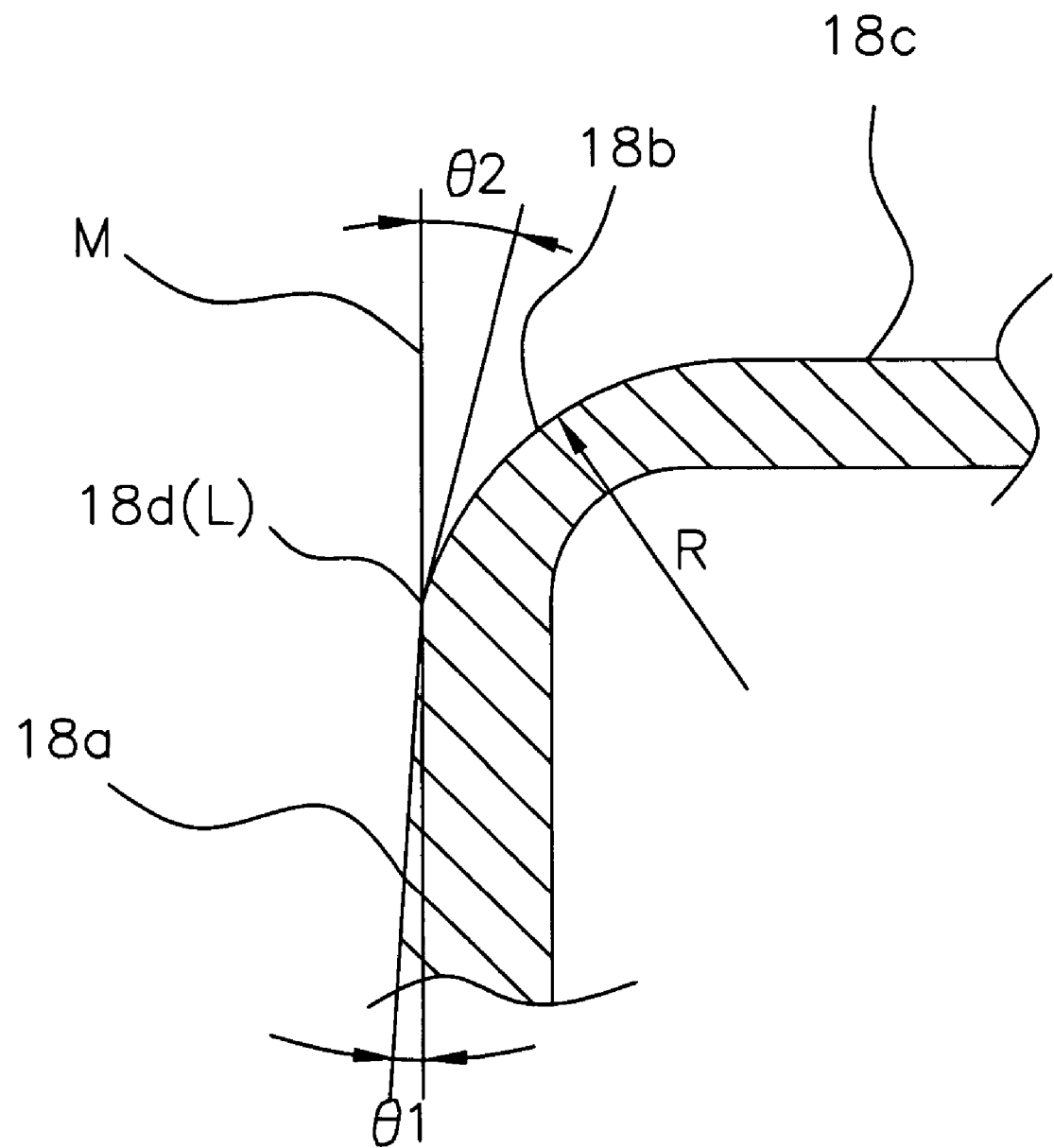
FIG. 5 is an enlarged partial cross-sectional view of a boundary between a second protruding portion and a second oblique portion of the spool of FIGS. 3 and 4 according to the first embodiment of the present invention.

The second protruding portion 18a, the second oblique portion 18b and the skirt cylindrical portion 18c are integrally formed with the bobbin trunk 7a. Therefore, the first protruding portion 17a, the bobbin trunk 7a, the second protruding portion 18a, the second oblique portion 18b and the skirt cylindrical portion 18c are integrally formed with a metal member. The second protruding portion 18a is formed in a smooth continuation with the rear end portion of the bobbin trunk 7a. Referring to FIG. 5, a base end portion of the second oblique portion 18b is formed in a continuation with the tip of the second protruding portion 18a so that a continuation portion is formed at an angle, thereby forming a pointed-shaped second corner portion 18d at a boundary of the base end portion of the second oblique portion 18b and the tip of the second protruding portion 18a. The tip of the second oblique portion 18b is formed in a smooth continuation with a front end portion of the skirt cylindrical portion 18c. Thus, the second oblique portion 18b includes a fillet shape having a contour with a radius R of approximately 5 to 8 mm, for example. An inner line extending along a front surface of the second protruding portion 18a intersects with a straight line M that is perpendicular to the spool shaft 15 at an angle of $\theta_1$. A tangent line along the fillet shape of the second oblique portion 18b that passes through the second corner portion 18d intersects the straight line M at an angle of $\theta_2$. The second corner portion 18d and the first corner portion 17d serve as an indication for a maximum winding position L of the fishing line.

Next, dimensional relationships of the spool 4 will be explained in reference to an enlarged lateral cross-sectional view shown in FIG. 4.

As shown in FIG. 4, the length A in the radial direction of the first protruding portion 17a is approximately the same as a length B in the radial direction of the second protruding portion 18a. A length C in the radial direction of the first oblique portion 17b is approximately the same as a length D in the radial direction of the second oblique portion 18b. In addition, it will be apparent to one of skill in the art from this disclosure that the length C may be set to be smaller than the length D. A maximum outer diameter E of the front flange portion 8 (maximum outer diameter of the first oblique portion 17b) is a summation of a maximum outer diameter G of the bobbin trunk 7a (maximum outer diameter of the bobbin cylindrical portion 16a), the length A of the first protruding portion 17a and the length C of the first oblique portion 17b. In addition, a maximum outer diameter F of the skirt portion 7b (maximum outer diameter of the skirt cylindrical portion 18c) is a summation of the maximum outer diameter G of the bobbin trunk 7a, the length B of the second protruding portion 18a in the radial direction and the length D of the second oblique portion 18b in the radial direction. Therefore, the maximum outer diameter E of the front flange portion 8 (maximum outer diameter of the first oblique portion 17b) is approximately the same as the maximum outer diameter F of the skirt portion 7b (maximum outer diameter of the cylindrical portion 18c).

Specifically, if the diameter of the bobbin trunk 7a is set to fall into the range of about 50.0-60.0 mm, for example, the radius G of the bobbin trunk 7a (the maximum outer diameter of the cylindrical portion 16a) is set to fall into the range of about 25.0-30.0 mm, for example, and the length C of the first oblique portion 17b in the radial direction and the length D of the second oblique portion 18b in the radial direction fall into the range of about 2.5-3.0 mm, for example. The length A of the first protruding portion 17a in the radial direction and the length B of the second protruding portion 18a in the radial direction fall into the range of about 10.0-12.0 mm, for example. In addition, the length C of the first oblique portion 17b in the radial direction and the length D of the second oblique portion 18b in the radial direction fall into the range of about 25-30%, for example, of the length A of the first protruding portion 17a in the radial direction and the length B of the second protruding portion 18a in the radial direction. Here, the length C of the first oblique portion 17b in the radial direction and the length D of the second oblique portion 18b in the radial direction are formed to be relatively longer than the length A of the first protruding portion 17a in the radial direction and the length B of the second protruding portion 18a in the radial direction.

Referring to FIG. 1, a fishing line lock 80 for locking the tip of the fishing line is mounted on the groove portion 7c. The groove portion 7c is formed on the front end side of the outer periphery of the skirt portion 7b. A through hole (not shown) penetrates the skirt portion 7b. The fishing line lock 80 is attached to the through hole. The through hole is formed on a front end portion of the groove portion 7c. The groove portion 7c is a concave portion that is more concave than other parts of the outer periphery of the skirt portion 7b. A rear portion of the groove portion 7c is in an approximately semi-circular shape. End portions on a front end side of the groove portion 7c are formed in a curved shape such that each of them is curved to laterally expand. Accordingly, it is possible to prevent the fishing line from being damaged when the fishing line contacts the groove portion 7c. Conversely, a conventional spool has end portions of a front end side of a groove portion that are linearly formed.

Referring to FIG. 3, the front flange fastening member 9 includes a third oblique portion 9a and a cylindrical male threaded portion 9b. The third oblique portion 9a protrudes such that a diameter of the third oblique portion 9a decreases toward a front end side of the third oblique portion 9a. The cylindrical male threaded portion 9b is formed on an outer periphery of a rear end portion of the front flange fastening member 9. The male threaded portion 9b is screwed into the female threaded portion 16b of the bobbin trunk 7a. A rear end portion of the third oblique portion 9a is mounted on the front flange portion 8 to contact the plate-shaped front end surface of the front flange portion 8. The front flange portion 8 is interposed between the rear end portion of the third oblique portion 9a and the first protruding portion 17a.

The drag mechanism 60 is mounted between the spool 4 and the spool shaft 15. The drag mechanism 60 applies a drag force to the spool 4. The drag mechanism 60 includes a knob portion 61 and a plurality of drag plates 62. The knob portion 61 manually adjusts the drag force. The drag plates 62 are pressed toward the spool 4 by the knob portion 61. A rear portion on a rear end side of the knob portion 61 of the drag mechanism 60 is accommodated in the inner peripheral portion of the front flange fastening member 9.

Next, the handling and operation of the reel will be explained.

When casting, the bail arm 44 is flipped over to the line-releasing position. Thus, the first bail support member 40 and the second bail support member 42 pivot. In this state, the fishing rod is cast while grasping the fishing line with the index finger of the hand with which the fishing rod is held. Accordingly, the fishing line is released with high momentum due to the weight of the tackle. After the tackle lands in the water, if the handle 1 is rotated in the line-winding direction, the rotor 3 rotates in the line-winding direction by the rotor driving mechanism 5 and the bail arm 44 returns to the line-winding position by a bail flipping mechanism (not shown). Thus, the fishing line will be prevented from being released because reverse rotation of the rotor 3 is prevented.

When the fishing line is to be wound in, the handle 1 is rotated in the line-winding direction. When this occurs, the rotation is then transmitted to the rotor 3 through the face gear 11 and the pinion gear 12. When the rotor 3 rotates, the fishing line is guided by the line roller 41 and wound around the spool 4.

The angler winds the fishing line around the bobbin trunk 7a using the tips of the first protruding portion 17a and the second protruding portion 18a. That is, the first corner portion 17d and the second corner portion 18d are indications of the maximum winding position L for the fishing line. Accordingly, it is possible to prevent the fishing line from being wound up to the limit of the height of the tip position of the front flange portion 8 (the first oblique portion 17b). Therefore, a situation in which bunched fishing line falls forward from the front flange portion 8 is avoided. Thus, backlash is prevented.

With the increasing diameter of the first oblique portion 17b, even if the fishing line runs on to the first oblique portion 17b, it becomes difficult for the fishing line to move forward any more. Therefore, it is possible to reliably prevent a backlash from being caused.

Figure 6:
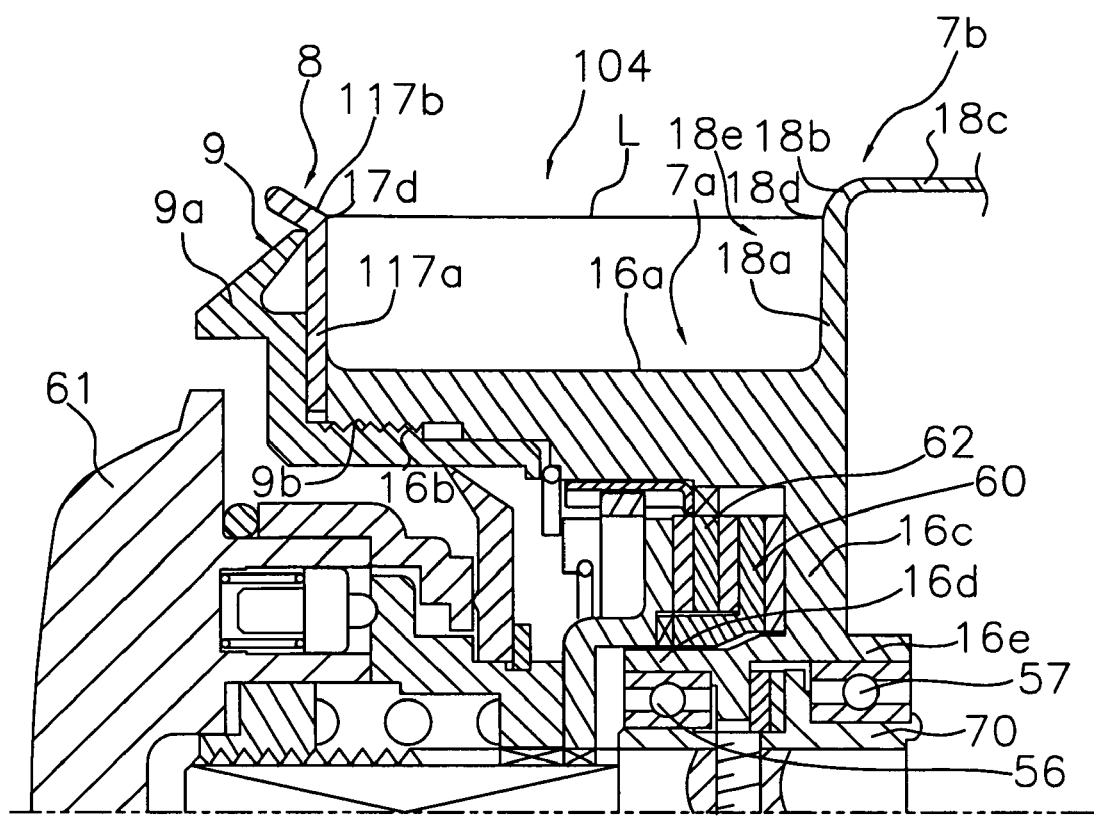
FIG. 6 is an enlarged lateral partial cross-sectional view of a spool for a spinning reel of FIGS. 1 and 2 according to a second embodiment of the present invention.

Furthermore, the length C of the first oblique portion 17b in the radial direction and the length D of the second oblique portion 18b in the radial direction are formed to be relatively shorter than the length A of the first protruding portion 17a in the radial direction and the length B of the second protruding portion 18a in the radial Second Embodiment Referring now to FIG. 6, a spool 104 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, the front flange portion 8 includes the first oblique portion 17b and the first protruding portion 17a, which are separately formed. As shown in FIG. 5, the second embodiment is the same as the first embodiment except that the spool 104 has a first oblique portion 117b and a first protruding portion 117a that are integrally formed. As in the first embodiment, the first obliqiue portion 117b is formed along a line at an angle of less than 45 degrees from an axis that the spool 104 rotates around.

Third Embodiment

Figure 7:
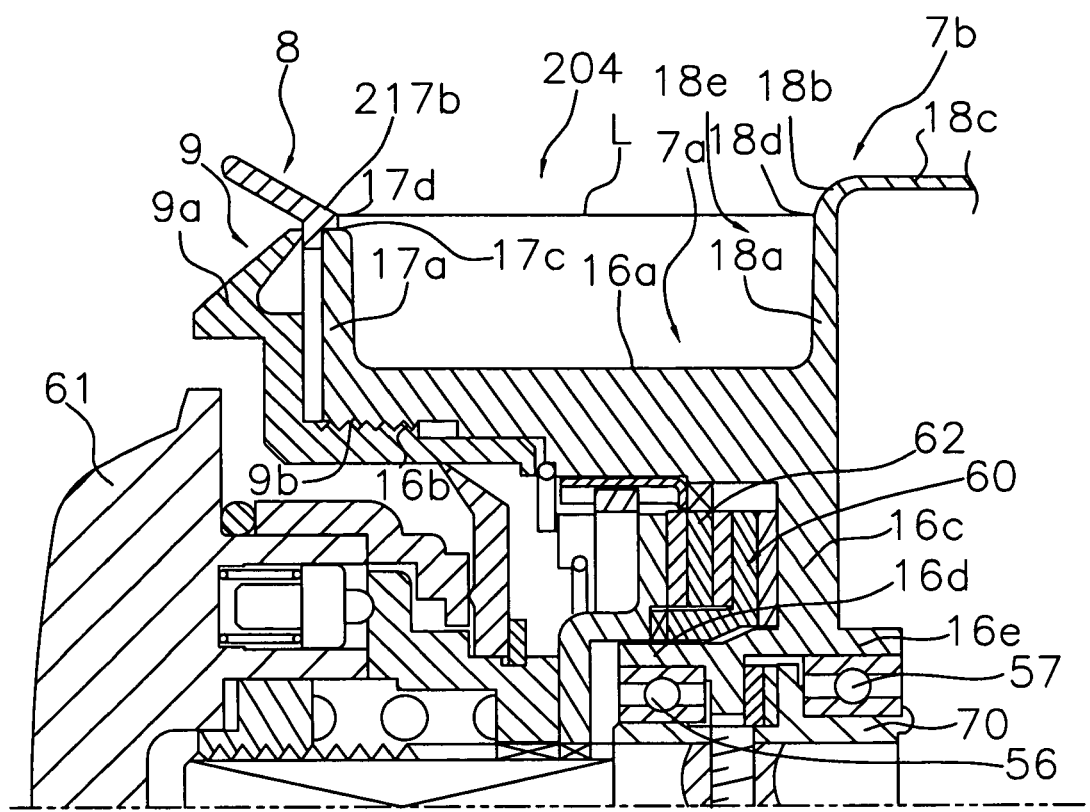
FIG. 7 is an enlarged lateral partial cross-sectional view of a spool for a spinning reel of FIGS. 1 and 2 according to a third embodiment of the present invention.

Referring now to FIG. 7, a spool 204 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the first embodiment, the length C of the first oblique portion 17b in the radial direction is approximately the same as the length D of the second oblique portion 18b in the radial direction. However, as shown in FIG. 6, the third embodiment is the same as the first embodiment except that the spool 204 has a first oblique portion 217b with a length C in the radial direction that is larger than the length D of the second oblique portion 18b in the radial direction. The first oblique portion 217b is formed along a line at an angle of less than 45 degrees from an axis that the spool 204 rotates around.

Fourth Embodiment

Figure 8:
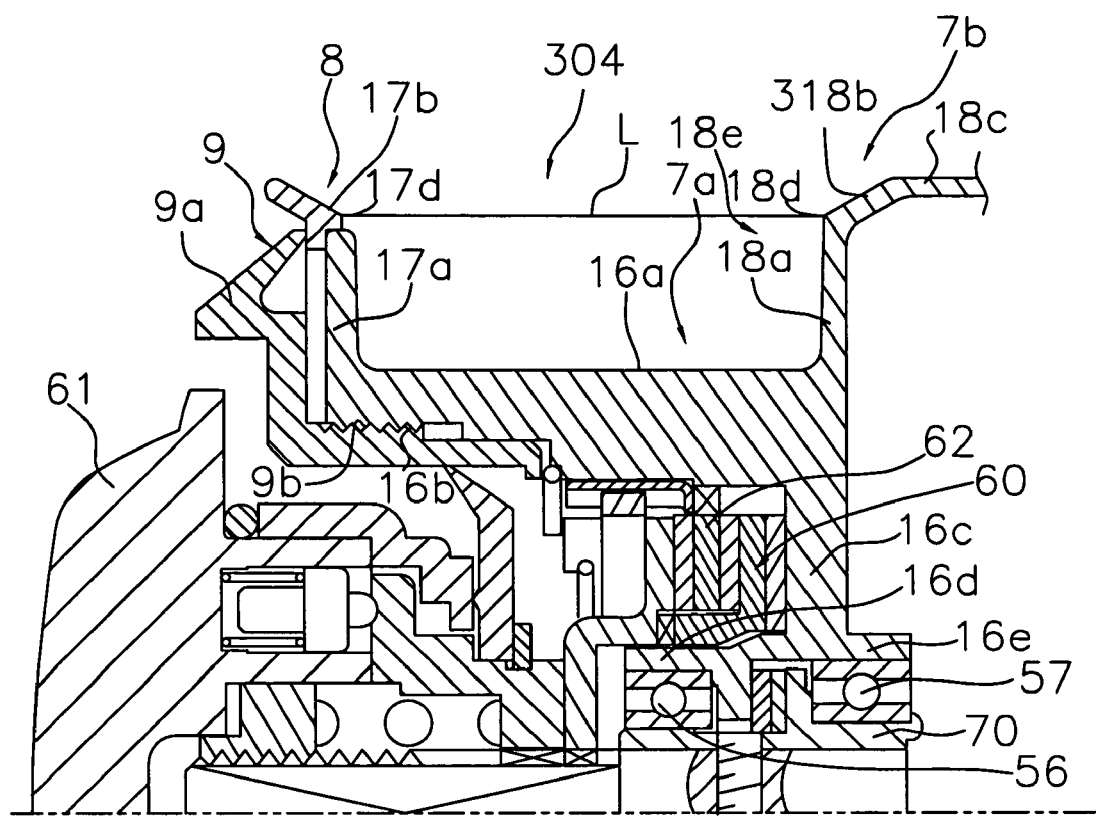
FIG. 8 is an enlarged lateral partial cross-sectional view of a spool for a spinning reel of FIGS. 1 and 2 according to a fourth embodiment of the present invention.

Referring now to FIG. 8, a spool 304 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the first embodiment, the tip of the second oblique portion 18b is formed in a smooth continuation of the front end portion of the cylindrical portion 18c. However, as shown in FIG. 7, the fourth embodiment is the same as the first embodiment except that the spool 304 has a second oblique portion 318b that includes a chamfer that slants rearward so that a diameter thereof increases toward a rear end side of the second oblique portion 318b.

Fifth Embodiment

Figure 9:
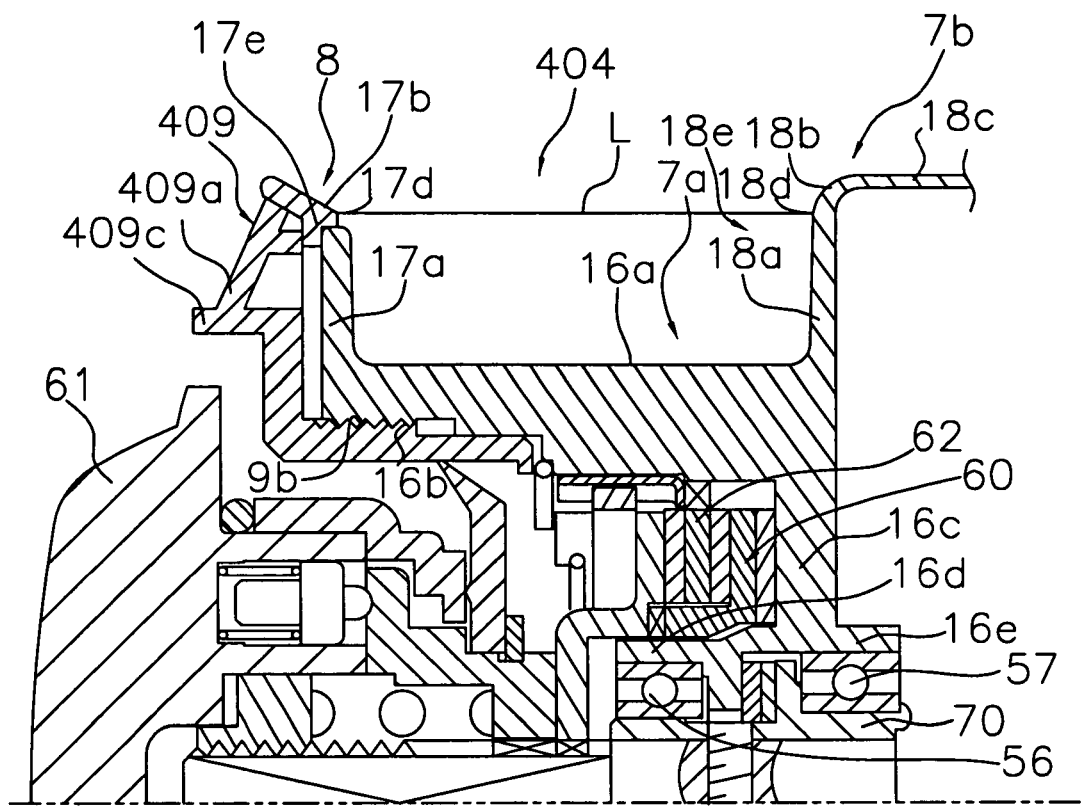
FIG. 9 is an enlarged lateral partial cross-sectional view of a spool for a spinning reel of FIGS. 1 and 2 according to a fifth embodiment of the present invention.

Referring now to FIG. 9, a spool 404 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the first embodiment, the front flange fastening member 9 is mounted on the front flange portion 8 so that the rear end portion of the third oblique portion 9a contacts the plate-shaped front end surface of the front flange portion 8. However, as shown in FIG. 8, the fifth embodiment is the same as the first embodiment except that the spool 404 has a front flange fastening member 409 that is mounted on the front flange portion 8 so that a rear end portion of a third oblique portion 409a contacts the front end surface of the first oblique portion 17b. In this configuration, the third oblique portion 409a is disposed to cover the front surface of the first oblique portion 17b. Therefore, even if the reel happens to fall, it is possible to prevent the front flange fastening member 409 from being scratched. The rear end portion of the third oblique portion 409a contacts not only the front surface of the first oblique portion 17b but also the plate member 17e of the front flange portion 8. In addition, as shown in FIG. 8, a front cylindrical portion 409c of the front flange fastening member 9 protrudes forward and is formed on a front end portion of the third oblique portion 409a. The rear portion on the rear end side of the knob portion 61 of the drag mechanism 60 is accommodated in the inner peripheral portion of the front cylindrical portion 409c.

Sixth Embodiment

Figure 10:
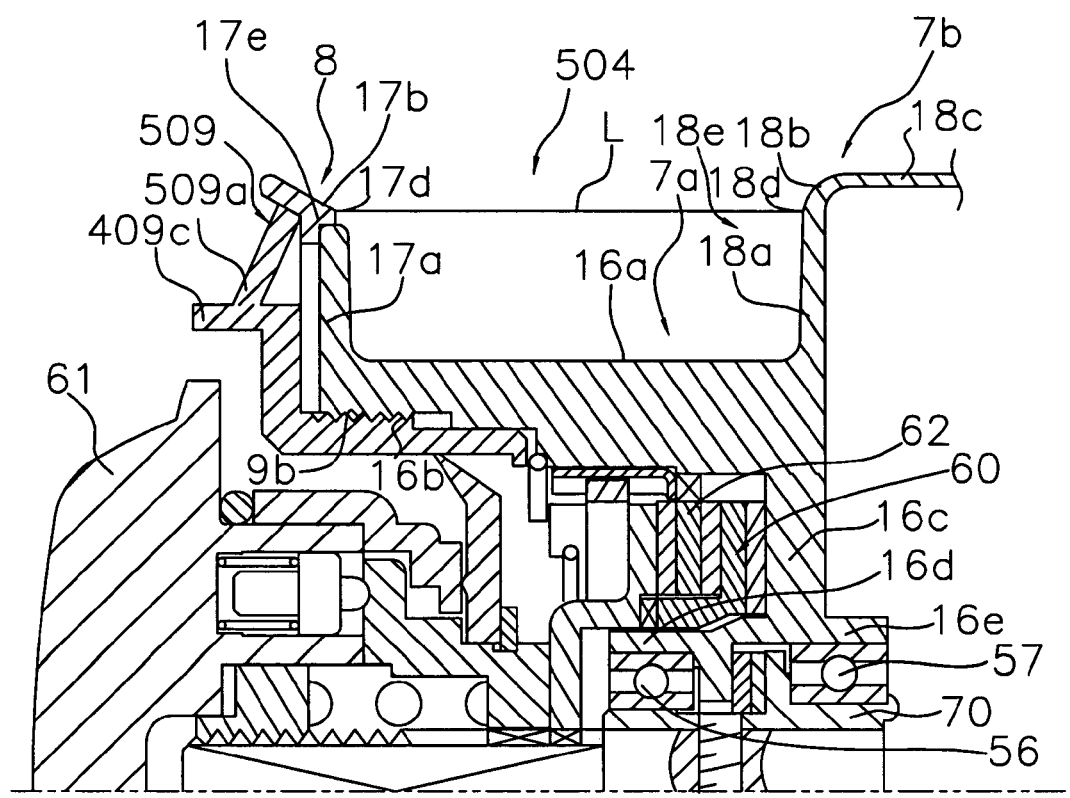
FIG. 10 is an enlarged lateral partial cross-sectional view of a spool for a spinning reel of FIGS. 1 and 2 according to a sixth embodiment of the present invention.

Referring now to FIG. 10, a spool 504 in accordance with a sixth embodiment will now be explained. In view of the similarity between the fifth and sixth embodiments, the parts of the sixth embodiment that are identical to the parts of the fifth embodiment will be given the same reference numerals as the parts of the fifth embodiment. Moreover, the descriptions of the parts of the sixth embodiment that are identical to the parts of the fifth embodiment may be omitted for the sake of brevity.

The sixth embodiment is the same as the fifth embodiment except that the spool 504 has a front flange fastening member 509 with a third oblique portion 509a. A rear end portion of the third oblique portion 9a contacts the front end surface of the first oblique portion 17b. In this configuration, the third oblique portion 9a only covers an end portion of the front surface of the first oblique portion 17b. Furthermore, the rear end portion of the third oblique portion 509a does not contact the plate member 17e of the front flange portion 8. The rear end portion of the third oblique portion 509a is disposed to contact only the front end surface of the first oblique portion 17b.

Seventh Embodiment

Figure 11:
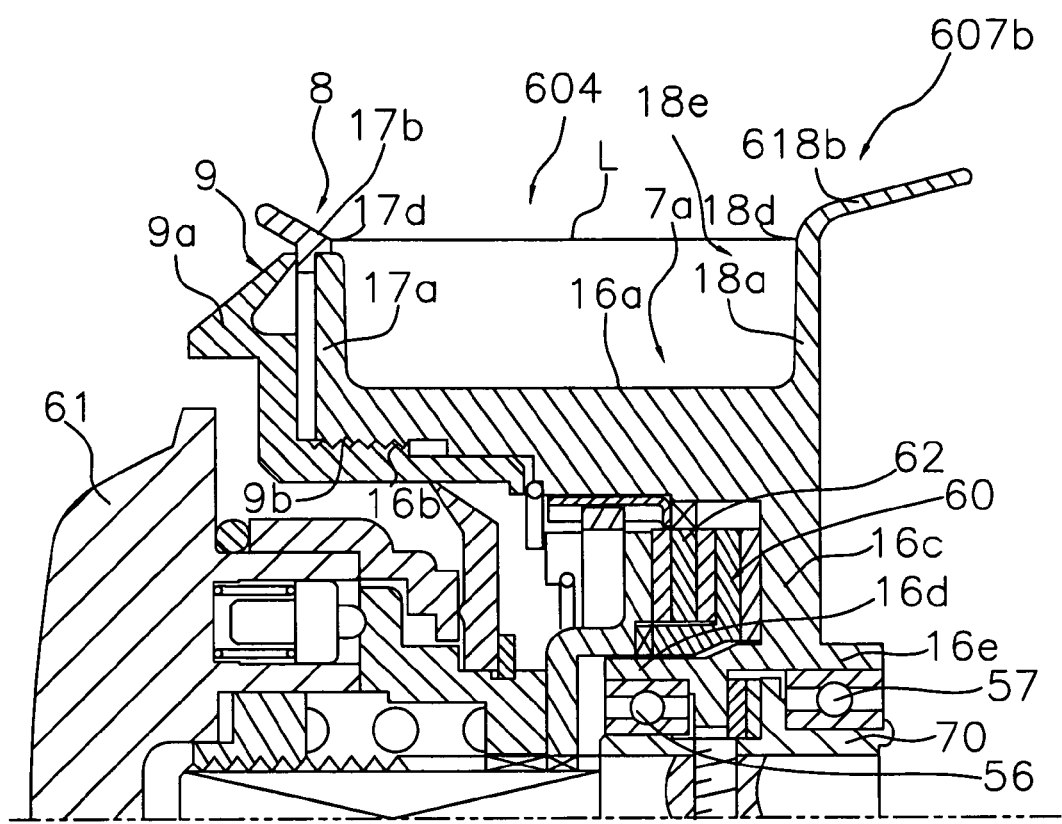
FIG. 11 is an enlarged lateral partial cross-sectional view of a spool for a spinning reel of FIGS. 1 and 2 according to a seventh embodiment of the present invention.

Referring now to FIG. 11, a spool 604 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

The seventh embodiment is the same as the first embodiment except that the spool 604 has a skirt portion 607b without the skirt cylindrical portion 18c.

Eighth Embodiment

Figure 12:
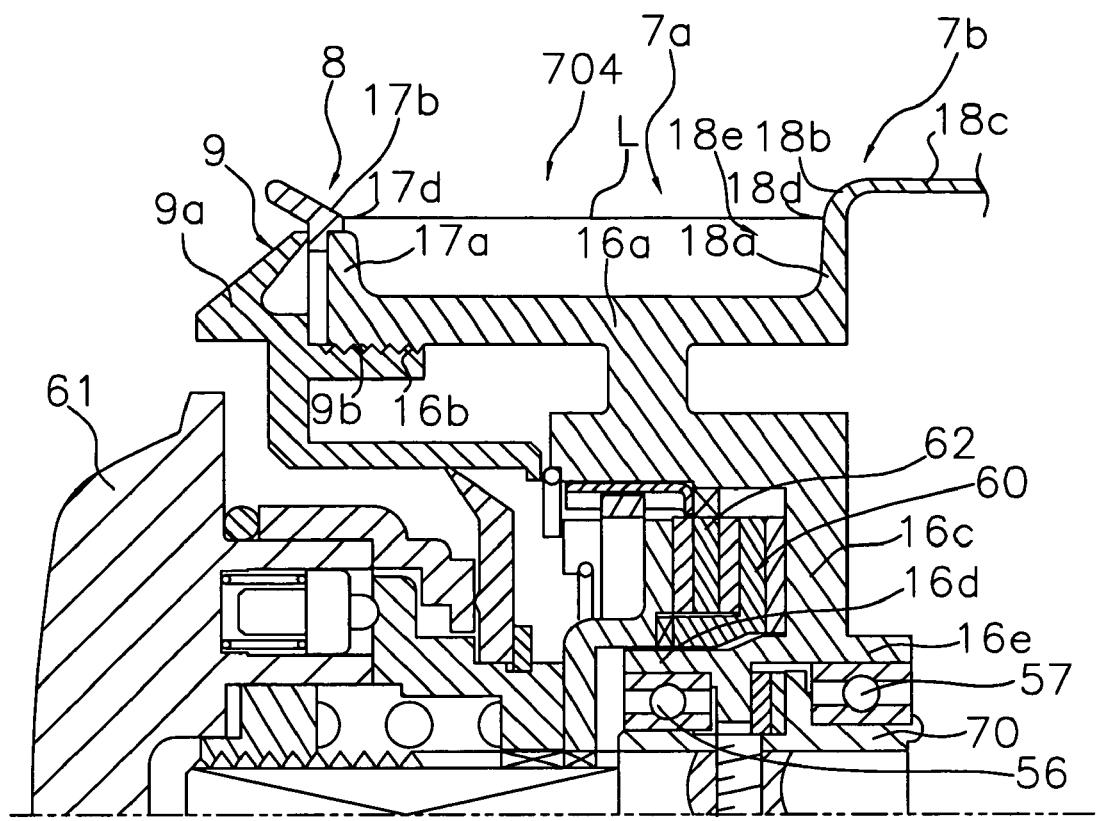
FIG. 12 is an enlarged lateral partial cross-sectional view of a spool for a spinning reel of FIGS. 1 and 2 according to an eighth embodiment of the present invention.

Referring now to FIG. 12, a spool 704 in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

In the first embodiment, the spool 4 for which a moderate amount of fishing line is wound is explained as an example of the present invention. However, the present invention can be applied to a spool for any other type of spinning reel. For example, as shown in FIG. 11, the present invention is applied to a shallow-groove spool 704 for which a small amount of fishing line is wound.

The terms of degree such as "substantially", "about" and "approximately" as used herein mean a reasonable amount of deviation of the modified term such that the end result is not significantly changed. For example, these terms can be construed as including a deviation of at least ± 5% of the modified term if this deviation would not negate the meaning of the word it modifies.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spool for a spinning reel comprising:
a cylindrical bobbin trunk having an outer periphery configured for winding fishing line thereon;
a front flange portion including a first protruding portion that protrudes outward in a radial direction from a front end portion of the bobbin trunk, and a first oblique portion that protrudes forward from a tip of the first protruding portion, the first oblique portion having a diameter that increases from the tip of the first protruding portion to a front end side of the first oblique portion;
a rear flange portion including a second protruding portion that protrudes outward in the radial direction from a rear end portion of the bobbin trunk, and a second oblique portion that protrudes rearward from a tip of the second protruding portion, the second oblique portion having a diameter that increases from the tip of the second protruding portion to a rear end side of the second oblique portion, the second protruding portion having a length that is approximately the same as a length of the first protruding portion in the radial direction; and a cylindrical portion that protrudes rearward from a tip of the second obliqiue portion.

2. The spool according to claim 1, wherein a length of the first oblique portion in the radial direction is approximately the same as a length of the second oblique portion in the radial direction.

3. The spool according to claim 1, wherein the first oblique portion is an annular member that is formed separately from the first protruding portion.

4. The spool according to claim 1, wherein a base end portion of the second oblique portion is formed in a continuation with the tip of the second protruding portion so that a continuation portion is formed in a pointed-shaped second corner portion, the tip of the second protruding portion is formed in a smooth continuation with a front end portion of the cylindrical portion, and the second oblique portion includes a fillet shape.

5. The spool according to claim 1, wherein the second oblique portion is integrally formed with the second protruding portion and the cylindrical portion.

6. The spool according to claim 1, wherein the bobbin trunk is integrally formed with the first protruding portion and the second protruding portion.

7. A spinning reel comprising:
a handle;
a reel unit rotatively supporting the handle;
a rotor rotatively supported on a front of the reel unit; and
a spool disposed at a front of the rotor and including
a cylindrical bobbin trunk having an outer periphery configured for winding fishing line thereon,
a front flange portion including a first protruding portion that protrudes outward in a radial direction from a front end portion of the bobbin trunk, and a first oblique portion that protrudes forward from a tip of the first protruding portion, the first oblique portion having a diameter that increases from the tip of the first protruding portion to a front end side of the first oblique portion,
a rear flange portion including a second protruding portion that protrudes outward in the radial direction from a rear end portion of the bobbin trunk, and a second oblique portion that protrudes rearward from a tip of the second protruding portion, the second oblique portion having a diameter that increases from the tip of the second protruding portion to a rear end side of the second oblique portion, the second protruding portion having a length that is approximately the same as a length of the first protruding portion in the radial direction, and
a cylindrical portion that protrudes rearward from a tip of the second obliqiue portion.

8. The spinning reel according to claim 7, wherein a length of the first oblique portion in the radial direction is approximately the same as a length of the second oblique portion in the radial direction.

9. The spinning reel according to claim 7, wherein the first oblique portion is an annular member that is formed separately from the first protruding portion.

10. The spinning reel according to claim 7, wherein a base end portion of the second oblique portion is formed in a continuation with the tip of the second protruding portion so that a continuation portion is formed in a pointed-shaped second corner portion, the tip of the second protruding portion is formed in a smooth continuation with a front end portion of the cylindrical portion, and the second oblique portion includes a fillet shape.

11. The spinning reel according to claim 7, wherein the second oblique portion is integrally formed with the second protruding portion and the cylindrical portion.

12. The spinning reel according to claim 7, wherein the bobbin trunk is integrally formed with the first protruding portion and the second protruding portion.

13. A spool for a spinning reel comprising:
a cylindrical bobbin trunk configured to be mounted at a front of a rotor and having an outer periphery configured for winding fishing line thereon;
a front flange portion including a first protruding portion that protrudes outward in a radial direction from a front end portion of the bobbin trunk, and a first oblique portion that protrudes forward from a tip of the first protruding portion, the first oblique portion having a diameter that increases from the tip of the first protruding portion to a front end side of the first oblique portion, and the first oblique portion being arranged on an outer periphery side of a maximum winding position of the fishing line; and
a rear flange portion including a second protruding portion that protrudes outward in the radial direction from a rear end portion of the bobbin trunk.

14. The spool according to claim 13, wherein the rear flange portion further includes a second oblique portion that protrudes rearward from a tip of the second protruding portion, the second oblique portion having a diameter that increases from the tip of the second protruding portion to a rear end side of the second oblique portion.

15. The spool according to claim 13, wherein the second protruding portion has a length that is approximately the same as a length of the first protruding portion in the radial direction.

16. The spool according to claim 13, wherein the front flange portion further includes a plate member, and a boundary between the first oblique portion and the plate member serves as an indication for the maximum winding position of the fishing line.

17. The spool according to claim 13, wherein the first oblique portion is formed along a line at an angle of less than 45 degrees from an axis that the spool rotates around.

18. The spinning reel according to claim 17, wherein the front flange portion further includes a plate member, and a boundary between the first oblique portion and the plate member serves as an indication for the maximum winding position of the fishing line.

19. The spinning reel according to claim 17, wherein the first oblique portion is formed along a line at an angle of less than 45 degrees from an axis that the spool rotates around.

20. The spinning reel according to claim 17, wherein the front flange has an outer diameter that is not less than an outer diameter of the rear flange.

21. The spool according to claim 13, wherein the front flange has an outer diameter that is not less than an outer diameter of the rear flange.

22. A spinning reel comprising:
a handle;
a reel unit rotatively supporting the handle;
a rotor rotatively supported on a front of the reel unit; and
a spool disposed at a front of the rotor and including a cylindrical bobbin trunk having an outer periphery configured for winding fishing line thereon, a front flange portion including a first protruding portion that protrudes outward in a radial direction from a front end portion of the bobbin trunk, and a first oblique portion that protrudes forward from a tip of the first protruding portion, the first oblique portion having a diameter that increases from the tip of the first protruding portion to a front end side of the first oblique portion, and the first oblique portion being arranged on an outer periphery side of a maximum winding position of the fishing line, and a rear flange portion including a second protruding portion that protrudes outward in the radial direction from a rear end portion of the bobbin trunk.

23. The spinning reel according to claim 22, wherein the rear flange further includes a second oblique portion having a diameter that increases from the tip of the second protruding portion to a rear end side of the second oblique portion.

24. The spinning reel according to claim 22, wherein the second protruding portion has a length that is approximately the same as a length of the first protruding portion in the radial direction.

* * * * *